(12) United States Patent
Kim

(10) Patent No.: US 7,911,092 B2
(45) Date of Patent: Mar. 22, 2011

(54) SPINDLE MOTOR

(75) Inventor: Yong Tae Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 533 days.

(21) Appl. No.: 11/744,380

(22) Filed: May 4, 2007

(65) Prior Publication Data

US 2007/0257567 A1 Nov. 8, 2007

(30) Foreign Application Priority Data

May 4, 2006 (KR) .................. 10-2006-0040351

(51) Int. Cl.
*H02K 5/24* (2006.01)
(52) U.S. Cl. .................... 310/67 R; 310/156.26
(58) Field of Classification Search ............. 310/156.26, 310/156.38, 51, 67 RR; 360/99.05, 99.12; 74/570.2
See application file for complete search history.

(56) References Cited

U.S. PATENT DOCUMENTS

| | | | |
|---|---|---|---|
| 1,758,191 A * | 5/1930 | Dorn ........................... | 318/816 |
| 1,915,090 A * | 6/1933 | Laurens ...................... | 310/163 |
| 2,032,552 A * | 3/1936 | Seyfried ..................... | 310/66 |
| 3,452,226 A * | 6/1969 | Hettich ...................... | 310/50 |
| 4,993,851 A * | 2/1991 | Nakanishi .................. | 384/512 |
| 5,861,687 A * | 1/1999 | Iwanaga et al. ............ | 310/90 |
| 5,941,133 A * | 8/1999 | Wierzba et al. ............ | 74/570.2 |
| 6,205,110 B1 * | 3/2001 | Miyamoto et al. ......... | 369/266 |
| 6,222,291 B1 * | 4/2001 | Boutaghou ................. | 310/90 |
| 7,434,240 B2 * | 10/2008 | Yoo et al. ................... | 720/702 |
| 7,461,391 B2 * | 12/2008 | Yoo ............................ | 720/702 |
| 2004/0232781 A1 * | 11/2004 | Yoo ............................ | 310/51 |

FOREIGN PATENT DOCUMENTS

| KR | 10-1999-0031832 | 3/2001 |
|---|---|---|
| KR | 10-2004-0005315 | 8/2005 |

* cited by examiner

*Primary Examiner* — Quyen Leung
*Assistant Examiner* — Naishadh N Desai
(74) *Attorney, Agent, or Firm* — Saliwanchik, Lloyd & Eisenschenk

(57) ABSTRACT

Embodiments of a spindle motor are provided. A spindle motor can include a base in contact with a bearing housing, a bearing installed in the bearing housing, a rotational shaft rotatably supported by the bearing, a stator disposed around the bearing housing and having a coil, a rotor including a rotor yoke fixed on the rotational shaft and a magnet fixed on the rotor yoke, a turntable provided above the rotor yoke and rotating together with the rotational shaft, and a plurality of balls provided in a space defined by the rotor yoke and the turntable.

13 Claims, 5 Drawing Sheets

SPINDLE MOTOR

CROSS-REFERENCE TO RELATED APPLICATION

The present application claims the benefit under 35 U.S.C. §119 of Korean Patent Application No. 10-2006-0040351, filed May 4, 2006, which is hereby incorporated by reference in its entirety.

BACKGROUND

1. Field of the Invention

The present invention discloses a spindle motor.

2. Description of the Related Art

A spindle motor may be applied to a variety of electronic devices. Typically, the spindle motor functions to write and/or read data on and/or from an optical disk.

BRIEF SUMMARY

Embodiments provide a spindle motor.

Embodiments provide a spindle motor that can attenuate vibration generated as a turntable rotates.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

An embodiment provides a spindle motor comprising: a base in contact with a bearing housing; a bearing installed in the bearing housing; a rotational shaft rotatably supported by the bearing; a stator disposed around the bearing housing and having a coil; a rotor including a rotor yoke fixed on the rotational shaft and a magnet fixed on the rotor yoke; a turntable provided above the rotor yoke and rotating together with the rotational shaft, and on which a disk is loaded; and a plurality of balls provided in a space defined by the rotor yoke and the turntable.

An embodiment provides a spindle motor comprising: a base in contact with a bearing housing; a bearing installed in the bearing housing; a rotational shaft rotatably supported by the bearing; a stator disposed around the bearing housing and having a coil; a rotor including a rotor yoke fixed on the rotational shaft and provided with a groove opened upward, and a magnet fixed on the rotor yoke; a turntable provided above the rotor yoke and rotating together with the rotational shaft, and on which a disk is loaded, the turntable being provided with a groove opened downward; and a plurality of balls provided in a space defined by the groove formed on the rotor yoke and the groove formed on the turntable.

An embodiment provides a spindle motor comprising: a base in contact with a bearing housing; a bearing installed in the bearing housing; a rotational shaft rotatably supported by the bearing; a stator disposed around the bearing housing and having a coil; a rotor including a rotor yoke fixed on the rotational shaft and provided with a groove opened upward, and a magnet fixed on the rotor yoke; a turntable provided above the rotor yoke and rotating together with the rotational shaft, and on which a disk is loaded; and a plurality of balls provided in the groove formed on the rotor yoke.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

First Embodiment

Figure 1:
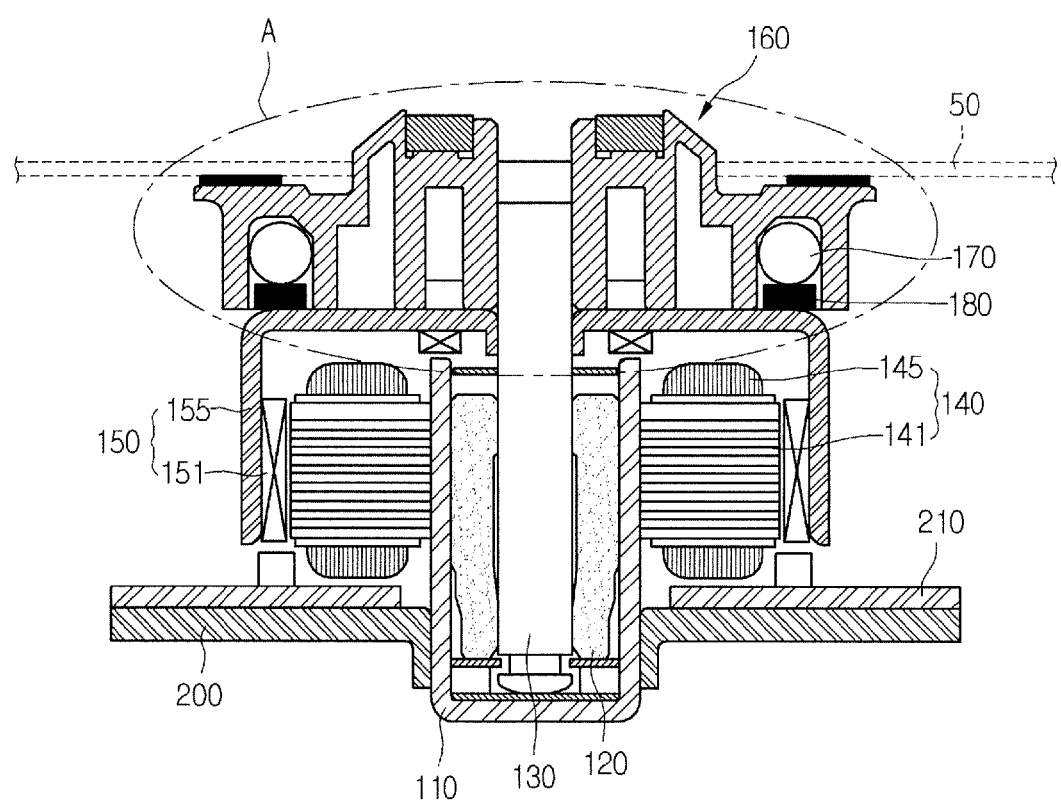
FIG. 1 is a cross-sectional view of a spindle motor according to a first embodiment of the present invention.
Figure 2:
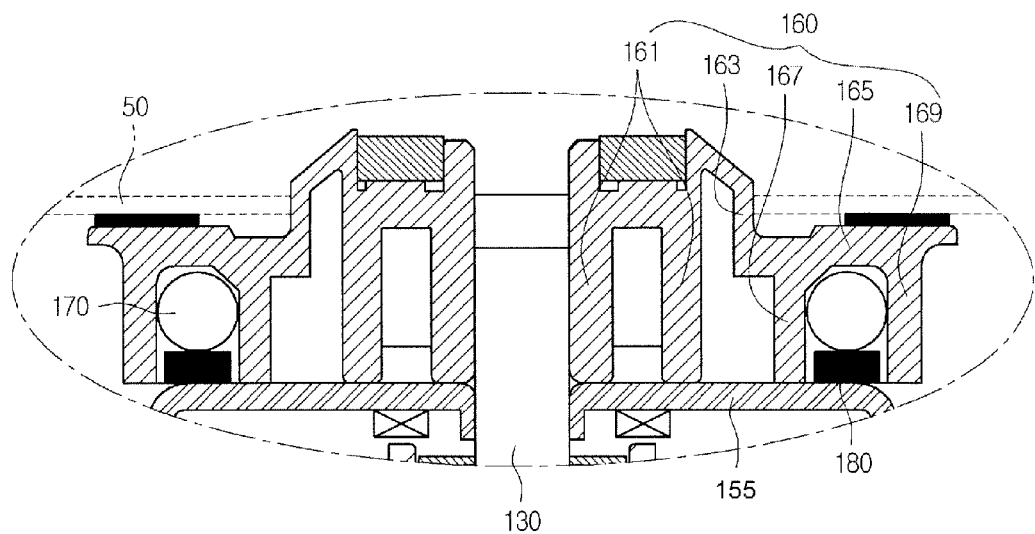
FIG. 2 is a partial enlarged view of the spindle motor of FIG. 1.
Figure 5:
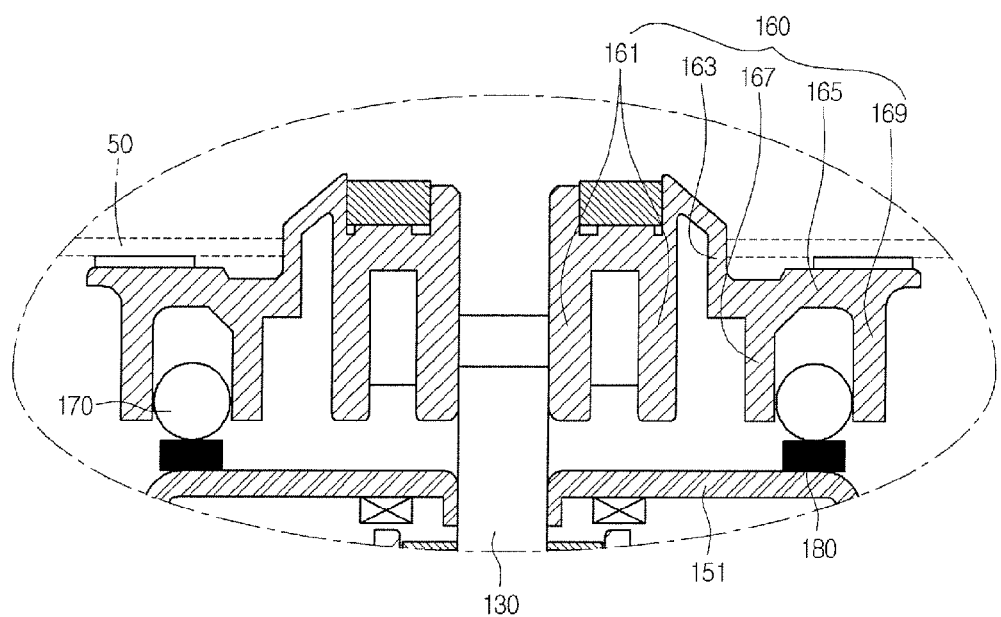
FIG. 5 is a partial enlarged view of another embodiment of the spindle motor of FIG. 1.

FIG. 1 is a cross-sectional view of a spindle motor according to a first embodiment of the present invention and FIG. 2 is a partial enlarged view of a portion "A" of FIG. 1. FIG. 5 is a partial enlarged view of another embodiment of the spindle motor of FIG. 1.

A spindle motor of a first embodiment includes a cylindrical base 200 having an opened top and a bearing housing 110 supported on the cylindrical base 200. The bearing housing 110 can be inserted in a hole formed through the base 200.

In the drawings, although the bearing housing 110 is shown separately prepared and coupled to the base 200, the bearing housing 110 and the base 200 may be integrally formed with each other.

That is, a portion of the base 200 may protrude in a cylindrical shape and function as the bearing housing 110.

A printed circuit board 210 for applying a control current may be installed on an upper portion of the base 200.

A ring-shaped bearing 120 can be installed in the bearing housing 110 and a rotational shaft 130 can be rotatably inserted in the bearing 120.

A stator 140 can be coupled on an outer circumference of the bearing housing 110 and a rotor 150 can be coupled to an outer circumference of the rotational shaft 130.

The stator 140 can include a core 141 fixed on the outer circumference of the housing 110 and a coil 145 wound around the core 141.

Although not shown in the drawings, in another embodiment, the core 141 may be fixed on the base 200.

The rotor 150 can include a rotor yoke 155 fixed on the outer circumference of the rotational shaft 130 and formed in a cylindrical shape having an opened bottom, and magnets 151 fixed on an inner circumference of the rotor yoke 155 and facing the stator 140.

The magnets 151 may be arranged so N and S poles are alternately magnetized.

When current is applied to the coil 145, the magnets 151 can rotate by interaction between an electric field generated by the coil 145 and a magnetic field generated by the magnets 151. Thus, the rotor yoke 155 and the rotational shaft 130 that are connected to the magnets 151 rotate.

In addition, a turntable 160 on which a disk 50 is loaded and supported can be coupled to the rotational shaft 130 above the rotor yoke 155.

Meanwhile, when the turntable 160 rotates by the rotation of the rotational shaft 130, vibration is generated by eccentricity between the turntable 160 and a disk 50.

In order to reduce the vibration caused by the eccentricity, a plurality of balls 170 can be stored in the turntable 160.

When the RPM of the turntable 160 becomes greater than a resonance frequency, the balls 170 move in a direction opposite to the eccentric mass by centrifugal force to offset the eccentricity and thus reduce the vibration.

Noise may be generated by the collision and friction between the balls 170 until the RPM of the turntable reaches a threshold value. Therefore, in order to minimize the noise, a felt 180 contacting the ball 170 can be provided.

In the spindle motor of the first embodiment, the felt 180 can be fixed on a top surface of the rotor yoke 155.

Referring to FIG. 2, the turntable 160 can include a fitting portion 161, a support portion 163, a table 165, and inner and outer walls 167 and 169.

The fitting portion 161 can be provided such that an inner circumference thereof is fitted around the rotational shaft 130.

The supporting portion 163 can be integrally formed with the fitting portion 161 and spaced apart from an outer surface of the fitting portion 161 by a predetermined distance. A disk 50 can be inserted and supported around the outer circumference of the supporting portion 163.

The table 165 horizontally extends from the outer surface of the supporting portion 163. The disk 50 can be loaded on the table 165.

The inner and outer walls 167 and 169 extend downward from the bottom of the table 165 and are spaced apart from each other by a predetermined distance. The inner and outer walls 167 and 169 can be formed in a ring shape.

The balls 170 can be provided in a space defined between the inner and outer walls 167 and 169.

The space in which the balls 170 are provided may be formed in a circular track shape so that a proper number of the balls 170 can move and rotate along the track-shaped space.

That is, the balls 170 may be disposed in a space defined by the inner and outer walls 167 and 169 of the turntable 160 and the rotor yoke 155.

At least one of the inner and outer walls 167 and 169 may be installed to be in contact with the rotor yoke 155.

The inner and outer walls 167 and 169 may be spaced apart from the rotor yoke 155 by a distance less than a radius of the ball 170 so that the balls 170 can properly move without escaping from the space, such as shown in FIG. 5.

The felt 180 contacting the balls 170 can be coupled to the top surface of the rotor yoke 155 corresponding to the space between the inner and outer walls 167 and 169.

Meanwhile, as shown in FIG. 1, a maximum distance in a horizontal direction from a center of the rotational shaft 130 to the space in which the balls 170 are received is less than a maximum distance in the horizontal direction from the center of the rotational shaft 130 to the outer circumference of the rotor yoke 155.

Further, a distance in the horizontal direction from the center of the rotational shaft 130 to the center of the ball 170 is less than a maximum distance in the horizontal direction from the center of the rotational shaft 130 to the outer circumference of the rotor yoke 155.

Therefore, the balls 170 can be located in the space defined by the inner and outer walls 167 and 169 of the turntable 160 and the rotor yoke 155.

Second Embodiment

Figure 3:
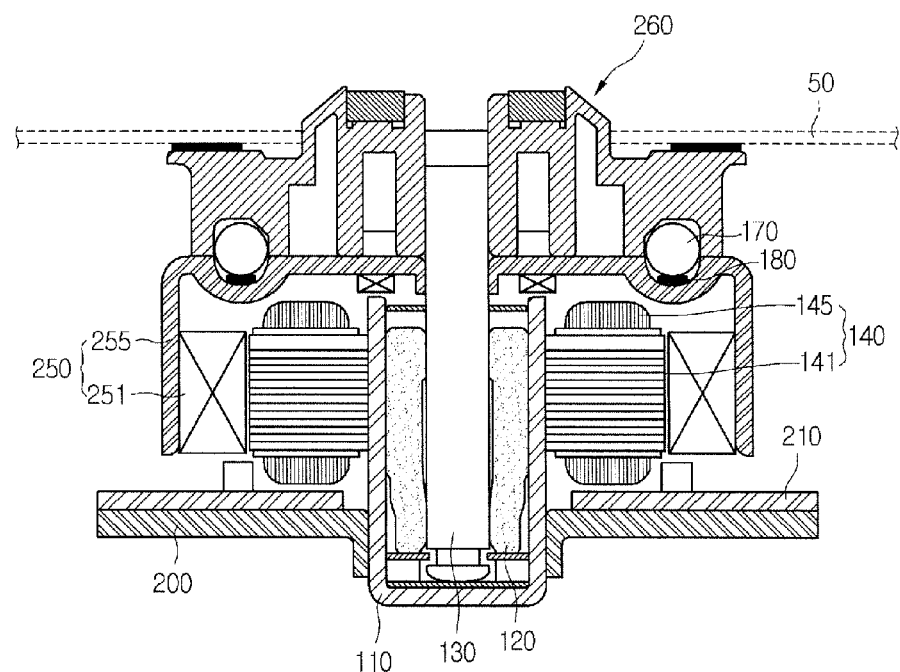
FIG. 3 is a cross-sectional view of a spindle motor according to a second embodiment of the present invention.
Figure 6:
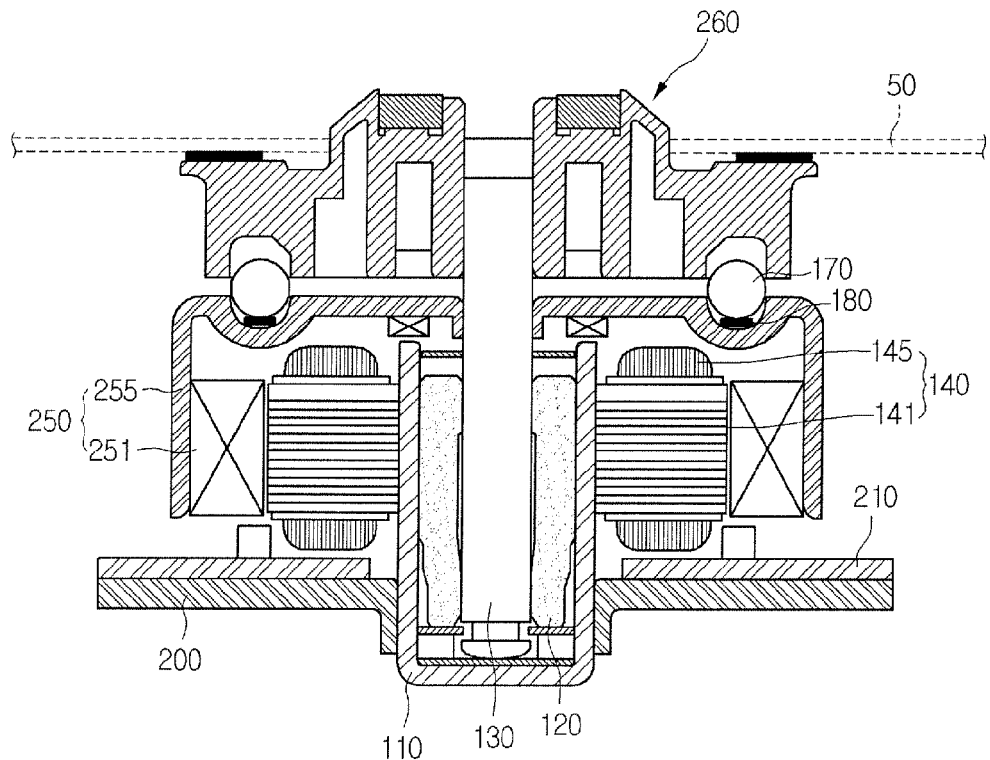
FIG. 6 is a cross-sectional view of a spindle motor according to another embodiment of the present invention.

FIGS. 3 and 6 are cross-sectional views of a spindle motor according to a second embodiment.

A spindle of a second embodiment may be similar to that of the first embodiment except for the shapes of the turntable 260 and rotor yoke 255.

A rotor 250 can include a rotor yoke 255 fixed on the outer circumference of a rotational shaft 130 and formed in a cylindrical shape having an opened bottom, and magnets 251 fixed on an inner circumference of the rotor yoke 255 and facing a stator 140. The rotor yoke 255 can enclose the stator 140.

In the second embodiment, the turntable 260 can be provided with a semicircular groove opened downward and the rotor yoke 255 can be provided with a semicircular groove opened upward.

Balls 170 can be disposed in a space defined by the grooves of the turntable 260 and the rotor yoke 255. In addition, a felt 180 may be formed on a bottom of the groove formed on the rotor yoke 255.

A part of each of the balls 170 is located in the groove formed on the rotor yoke 255 and another part of each of the balls 170 is located in the groove formed on the turntable 260.

The shapes of the grooves formed on the turntable 260 and the rotor yoke 255 may be variously designed. For example, they can be designed in a semicircular shape, a rectangular shape, a regular square shape, and a square shape having an inclined side surface.

The bottom of the groove formed on the rotor yoke 255 may be rounded or flat.

Third Embodiment

Figure 4:
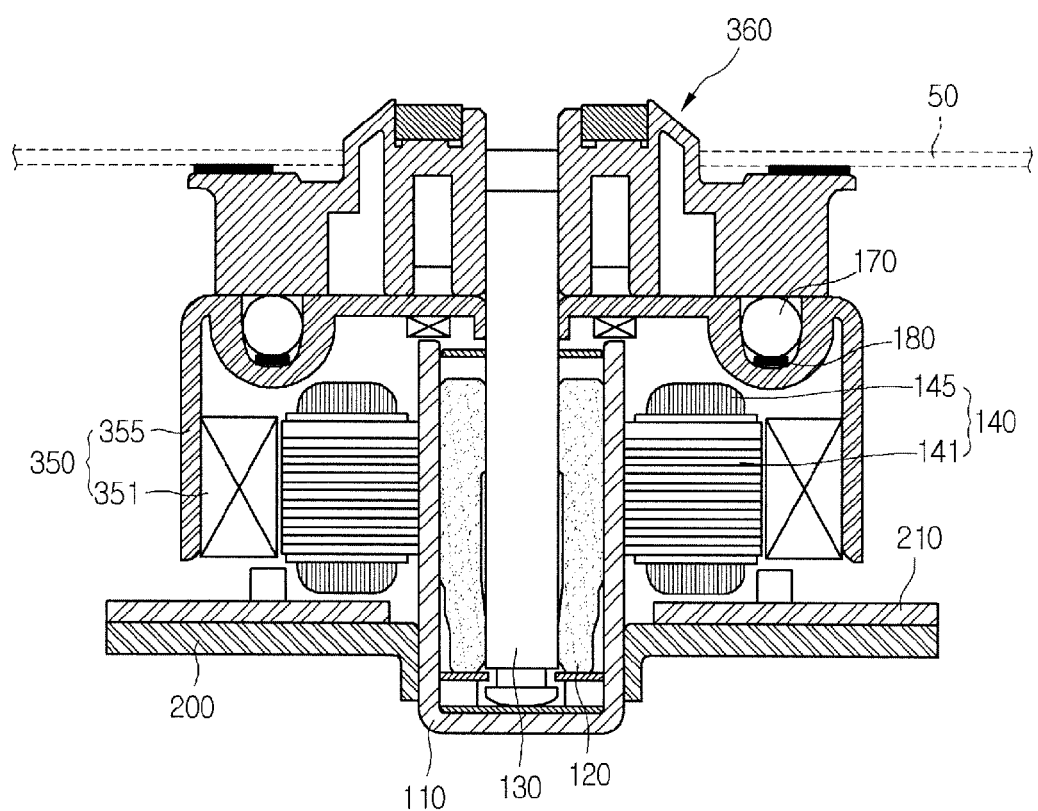
FIG. 4 is a cross-sectional view of a spindle motor according to a third embodiment of the present invention.
Figure 7:
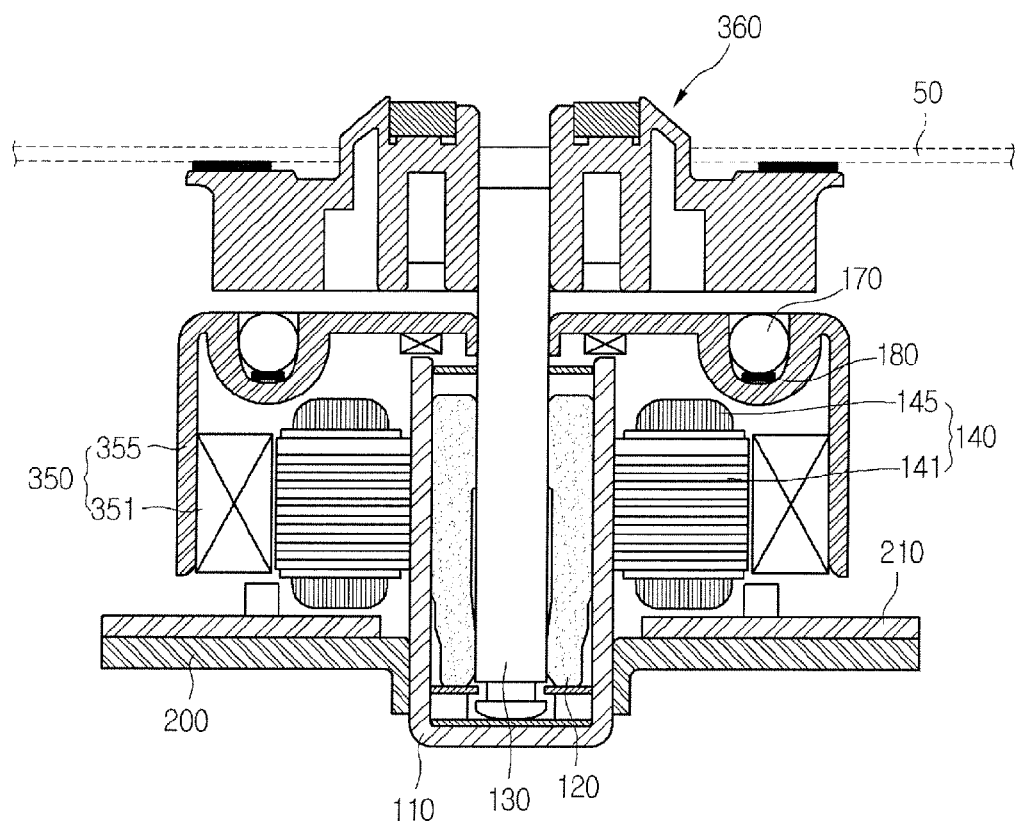
FIG. 7 is a cross-sectional view of a spindle motor according to another embodiment of the present invention.

FIGS. 4 and 7 are views of a spindle motor according to a third embodiment.

A spindle motor of a third embodiment can be similar to those of the first and second embodiments except for the shapes of the turntable 360 and rotor yoke 355.

A rotor 350 can include a rotor yoke 355 fixed on the outer circumference of a rotational shaft 130 and formed in a cylindrical shape having an opened bottom, and magnets 351 fixed on an inner circumference of the rotor yoke and facing a stator 140. The rotor yoke 355 can enclose the stator 140.

In the third embodiment, the turntable 360 is not provided with a semicircular groove opened downward, but the rotor yoke 355 is provided with a semicircular groove opened upward.

The balls 170 can be located in a space defined between the bottom of the turntable 360 and the groove of the rotor yoke 355. A felt 180 may be formed on a bottom of the groove formed on the rotor yoke 355.

The balls 170 can be located in the groove formed on the rotor yoke 355. Here, the bottom of the turntable 360 can function to allow the balls 170 to properly move without escaping.

In the third embodiment, although the bottom of the turntable 360 is shown as being flat, the present invention is not limited to this configuration. That is, a groove, a projection, an inclination, or a curved surface may be formed on the bottom of the turntable 360. These configurations can be formed so as to prevent the balls from being removed or escaping the groove.

The shapes of the grooves formed on the rotor yoke 355 may be variously designed. For example, they can be designed in a semicircular shape, a rectangular shape, a regular square shape, and a square shape having an inclined side surface.

The bottom of the groove formed on the rotor yoke 355 may be rounded or flat.

According to embodiments, the balls can be received in the space defined between the turntable and the rotor yoke to reduce the vibration caused by the rotation of the turntable. Therefore, no separated mechanical member for receiving the balls is necessary.

Further, even when a separated mechanical member for providing the space receiving the balls is provided, the balls are not separated and removed or escaped even when the separated mechanical member is damaged.

Furthermore, since the felt formed on the top surface of the rotor yoke is provided as a noise-proof member, the noise caused by the rotation of the turntable can be reduced.

Any reference in this specification to "one embodiment," "an embodiment," "example embodiment," etc. mans that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with the one of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
   a base in contact with a bearing housing;
   a bearing installed in the bearing housing;
   a rotational shaft rotatably supported by the bearing;
   a stator disposed around the bearing housing and having a coil;
   a rotor comprising:
   a rotor yoke fixed on the rotational shaft, wherein the rotor yoke is provided with a groove opened upward, the groove being opened upward within a first upwardly directed inner sidewall and a second upwardly directed inner sidewall facing the first upwardly directed inner sidewall, and
   a magnet fixed on the rotor yoke;
   a turntable for a loaded disk provided above the rotor yoke and capable of rotating together with the rotational shaft, wherein the turntable is provided with a groove opened downward; and
   a plurality of balls provided in a space defined by the groove provided on the rotor yoke and the groove provided on the turntable,
   wherein the first upwardly directed inner sidewall is disposed at a first distance from the rotational shaft in a radial direction, and wherein the second upwardly directed inner sidewall is disposed at a second distance larger than the first distance in the radial direction.

2. The spindle motor according to claim 1, further comprising a noise-proofing member disposed on the groove provided on the rotor yoke for contacting the plurality of balls.

3. The spindle motor according to claim 2, wherein the noise-proofing member is a felt.

4. The spindle motor according to claim 1, wherein a bottom of the groove provided on the rotor yoke is rounded, and
   wherein the bottom of the groove is disposed at a position higher than a top of the bearing housing.

5. The spindle motor according to claim 1, wherein a bottom of the groove provided on the rotor yoke is flat, and
   wherein the bottom of the groove is disposed at a position higher than a top of the bearing housing.

6. The spindle motor according to claim 1, wherein the turntable comprises:
   a fitting portion fitted around the rotational shaft,
   a supporting portion integrally formed on an outer surface of the fitting portion,
   a table on which the loaded disk is to be located, the table extending from an outer surface of the supporting portion, and
   inner and outer walls formed in a ring shape on a bottom surface of the table and spaced apart from each other by a predetermined distance,
   wherein the plurality of balls is provided in the space defined between the inner and outer walls.

7. The spindle motor according to claim 6, wherein the turntable comprises outer and inner walls provided at a lower side of the turntable, and wherein the space defined by the rotor yoke and the turntable is defined by the inner and outer walls and the top surface of rotor yoke.

8. The spindle motor according to claim 1, wherein a bottom surface of the turntable and a top surface of the rotor yoke contact each other.

9. The spindle motor according to claim 1, wherein a bottom surface of the turntable and a top surface of the rotor yoke are spaced apart from each other by a predetermined distance less than a radius of a selected ball of the plurality of balls.

10. The spindle motor according to claim 1, wherein the bottom surface of the bearing housing is downwardly protruded from the base.

11. The spindle motor according to claim 1, wherein the rotor yoke includes a first portion directly contacted with the rotational shaft, a second portion extending radially outward from the first portion, and a third portion extending downward from the second portion, and
    wherein the second portion includes the groove.

12. The spindle motor according to claim 11, wherein the turntable includes an inner circumferential surface, an outer circumferential surface, and a disk supporting portion disposed on an upper side of the outer circumferential surface and protruding radially outward,
    wherein the inner circumferential surface is in direct contact with the rotational shaft, and
    wherein the inner circumferential surface is arranged radially inward of the third portion.

13. The spindle motor according to claim 11, wherein the disk supporting portion is arranged radially inward of an outer circumferential surface of the third portion.

* * * * *